Nov. 24, 1970                  D. L. HARVELL                 3,543,212
                        POWER CONTROL SWITCHING DEVICES
                             Filed Dec. 12, 1967
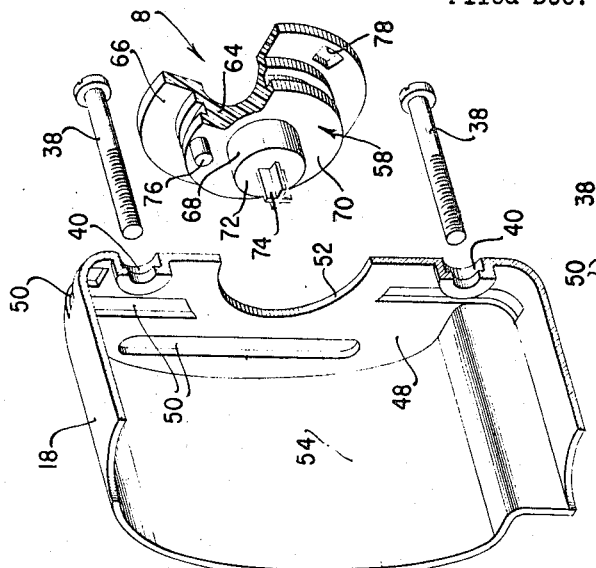
Fig.1.
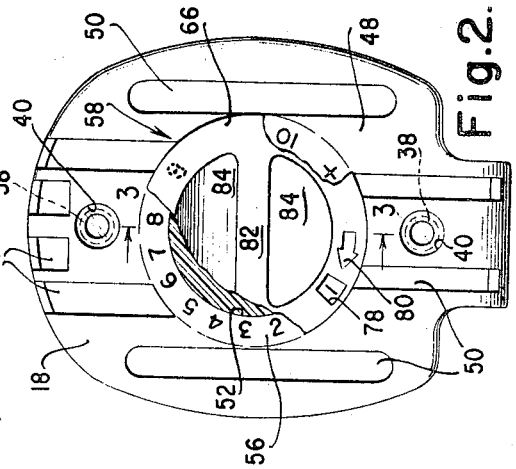
Fig.2.
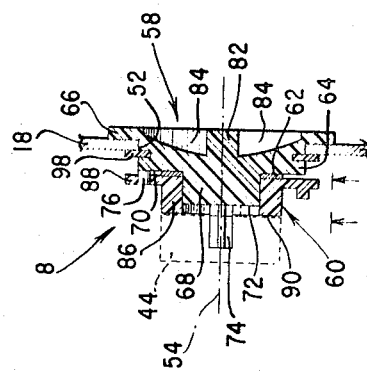
Fig.3.
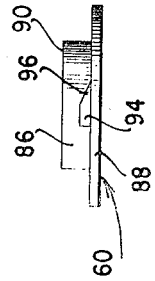
Fig.4.
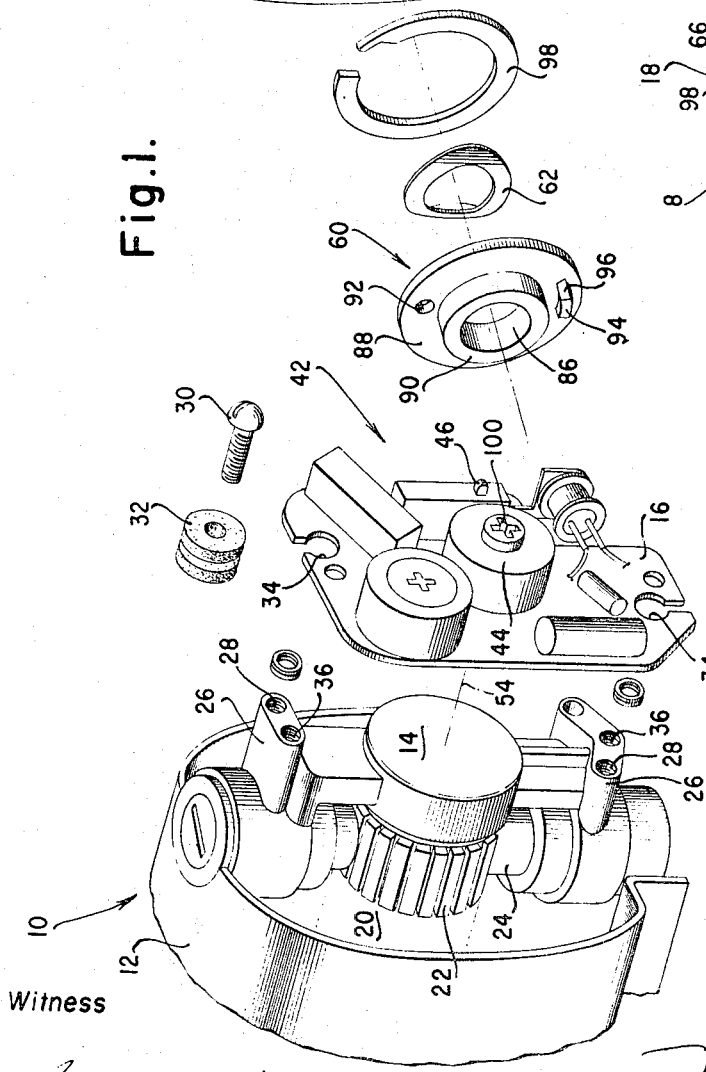
Witness
*Rosalind Tsai*
INVENTOR.
Don L. Harvell
BY
*Marshall J. Breen*
ATTORNEY

# United States Patent Office 3,543,212
Patented Nov. 24, 1970

3,543,212
POWER CONTROL SWITCHING DEVICES
Don L. Harvell, Greenville, S.C., assignor to The Singer Company, New York, N.Y., a corporation of New Jersey
Filed Dec. 12, 1967, Ser. No. 689,833
Int. Cl. H01c 9/08
U.S. Cl. 338—198         2 Claims

ABSTRACT OF THE DISCLOSURE

This disclosure relates to a power control switching device for a portable power tool having a motor housed therein, said device is operator influenced to make effective one or the other control elements of a control circuit of the electric motor to vary the range of speed below a maximum speed or to set a maximum speed for the tool.

BACKGROUND OF THE INVENTION

Heretofore, portable electric tools of the selectively variable speed type used a plurality of remotely located operator actuated conrol members for varying the speed of the motor. The control members had to be individually set to obtain the desired speed of operation for the tool. This resulted in a complex structural arrangement in which a plurality of operator influenced settings were required whenever the speed settings were changed.

SUMMARY OF THE INVENTION

In accordance with the present invention the novel power control switching device is provided for making effective one or the other control elements of a circuit of an electric motor to vary the range of speed below the maximum speed or to set the maximum speed of the motor, which motor is disposed in a housing of and powering a portable tool. The device comprises a control knob that has one end mechanically connected to the range of speed element of the circuit and has the other end extended outwardly of the housing to be operator influenced to selectively vary the speed of said motor. A camming member is non-rotatably connected to the control knob means and held between the control knob means and the range of speed element. The camming member is normally out of engagement with the maximum speed element and on being turned with the control knob means engages the maximum speed element to operate the motor at maximum speed. A resilient means is disposed between the control knob means and the camming member to continuously urge the camming member away from the control knob means.

It is therefore an object of the present invention to provide an improved power conrol switching device which overcomes the prior art disadvantages; which is simple, economical and reliable; which is operator controlled by a single control knob for selectively engaging one or the other control elements; which is mounted in superposition to a control circuit board upon which said control elements have been mounted; which has a control knob mechanically connected to the range of speed element; which has a spring biased camming member carried between the control knob and the range of speed element with the camming member turnable with said knob to operatively engage the maximum speed element; which has a spring biased camming member abutting one control element to allow for assembly and manufacturing tolerances; and which uses a control knob turnably mounted in the end cover in superposition to the control circuit board.

Other objects and advantages will be apparent from the following description of one embodiment of the invention and the novel features will be particularly pointed out hereinafter in the claims.

BRIEF DESCRIPTION OF THE DRAWING

This invention is illustrated in the accompanying drawings in which:

FIG. 1 is an exploded view illustrating the assembly of the components housed at the end cover of the power tool, and embodying the power control switching device of the present invention.

FIG. 2 is a view looking at the outer wall of the end cover in which said switching device is embodied.

FIG. 3 is a sectional view of said switching device taken along line 3—3 of FIG. 2.

FIG. 4 is a view of the camming member of said switching device taken along line 4—4 of FIG. 3.

DESCRIPTION OF THE INVENTION

In the drawings the novel power control switching device, designated generally as 8, is illustrated as embodied in a conventional power tool, such as a sabre saw 10, having a motor housing 12 with an integral bearing bracket 14 that also serves as a mounting means for a control circuit board 16, and an end cover 18.

An electric motor 20 of a universal type having the field windings in series with the armature windings is journaled in the motor housing 12. The motor 20 is provided with the usual commutator 22 and brushes 24, with the remainder of the motor components, including the "on-off" switch not shown.

The bearing bracket 14 has diametrically positioned bosses 26 which have vertically offset tapped holes 28 that receive screws 30 for securing the control circuit board 16.

The connection of the board 16 is made resilient by affixing rubber bushings 32 in open ended apertures 34 through which the screws 30 pass to connect into the boss 26. A more detailed description of this type of circuit board mounting may be had by reference to U.S. Pat. No. 3,225,232.

Tapped holes 36 in vertical alignment are also formed in bosses 26 to receive screws 38 that extend through countersunk holes 40 in the end cover for securing the end cover 18 to the motor housing 12.

A control circuit, designated generally as 42, is mounted on control circuit board 16 and includes all of the electrical components necessary to provide a speed responsive regulating function of which only potentiometer 44 has been identified as it is the only component having a setting that is directly operator influenced. However, the control circuit 42 may be basically the same as that shown and described in the U.S. Pat. No. 2,939,064, now Reissue Pat. No. 25,203, to which reference may be had for a more complete understanding thereof. In addition to the branch of the control circuit 42 that relates to the regulation of the speed, there is a second branch that enables the electric motor 20 to operate a maximum speed by bypassing the range of speed branch, which second branch includes a microswitch 46, the activation of which serves to connect the motor directly with the line current, and to operate the motor at maximum speed. The potentiometer 44 and the microswitch 46 are mounted side by side on the control circuit 16.

The outer wall 48 of the end cover 18 has a plurality of vertically extending apertures 50 that permit the passage of air therethrough for cooling of the motor 20 and the control circuit 42. A larger centrally disposed circular aperture 52 is formed in the wall 48 in superposition to the potentiometer 44 and the microswitch 46. The longitudinal center of the potentiometer 44 is coincidental to the center of aperture 52, and each lie substantially along the axial line 54 of the motor 20.

Indicia 56 is formed on the outer face of the wall 48 circumferentially spaced about the aperture 52, and numbered 1 through 10 increasing, as viewed in FIG. 2, in a clockwise direction. The indicia numbers correspond to the range of speed settings of the potentiometer 44 with 1 being the slowest and 10 being the fastest. Past the 10 in the clockwise direction is a "+" that also is part of the indicia 56 and corresponds to the speed setting of the microswitch 46 at its maximum speed as more fully explained hereinafter.

The power control switching device 8 includes a control knob 58 to which a camming member or disc 60 is non-turnably connected with a dish shaped annular flange 66 extending radially outwardly of the outer end thereof. A hub 68 of reduced diameter extends axially inwardly from a shoulder 70, formed at the inner end of the section 48, to terminate in a shoulder 72 from which extends a connecting bar 74 formed with a cross section in the shape of an X. A pin 76 is carried on one side of the shoulder 70 in parallel relationship to the bar 74. The flange 66 is of a large enough diameter to cover indicia 56 on the control knob 58 being inserted into aperture 52. A window 78 is made in the flange 66 to register with the indicia 56 to indicate the speed at which the tool will operate.

An arrow 80 is indented in the flange 66 pointing clockwise as viewed in FIG. 2 to indicate the direction of increase of speed. For operator ease in manipulating the control knob 58, it has a turn bar 82 with a recess 84 on either side thereof.

The camming member 60 illustrated in FIGS. 1, 3 and 4 has an annular hub 86 extending axially inwardly from a camming disc 88 to terminate in a substantially flat annulr forward edge 90. A circular aperture 92 is formed on one side of the hub 86 and an inwardly facing cam 94 with an inclined leading edge 96 is formed on the other side of hub 86.

Before the end cover 18 is connected to the housing 12, the control knob 58, as shown in FIGS. 2 and 3, is assembled in the end cover 18 by passing the mid-section 64 into the aperture 52 and securing a spring clamp 98 in the annular groove thereof.

This connection holds the control knob 58 captive, but free to turn responsive to operator manipulation of the turn bar 82.

After the control knob 58 is secured to the end cover 18, the dish-shaped annular spring 62 is placed on the hub 68 in abutment with the shoulder 70 and radially inwardly of the pin 76. Next, the annular hub 86 of the camming member 60 is mounted on the hub 68 of the control knob 58. The pin 76 and the aperture 92 are substantially of the same diameter so that on mounting the camming member 60 on the control knob 58 the pin 76 will pass into the aperture 92 to non-turnably connect the camming member 60 to the control knob 58.

On mounting the end cover 18 to the housing 12, the connection bar 74 which serves as the male element is mechanically connected to the potentiometer 44 by extending into a correspondingly X-shaped opening or female element 100 formed therein. In the assembled position the cam 94 of the camming disc 88 is in arcuate line with the switching element of the microswitch 46 so that on turning of the control knob 58 to the end of its clockwise travel, the inclined leading edge 96 of the cam 94 will make initial contact and successively engage said switch to actuate the same.

Due to the resilient mounting of the control circuit board 16 and a usual amount of manufacturer's tolerance of the components of the tool 10 and the assembly thereof, a certain degree of axial flexibility must be "built-in" to the power control switching device 8 in order to prevent malfunctions of the tool 10 or increased costs in producing the same.

The spring 62 provides the necessary flexibility and acts to continuously yieldably urge the forward edge 90 of the hub 86 to abut the recessed annular face of the potentiometer 44 as illustrated in FIG. 3.

In assembling the end cover 18 to the housing 12, the potentiometer 44 will be set to correspond to the speed indicated by the indicia 56 so that the mechanical connection between the potentiometer 44 and the control knob 58 will be synchronized. This may conveniently be done by setting both for the slowest speed prior to connecting them.

The arcuate travel of the potentiometer is about 290 degrees, which travel permits the control knob 56 to be manipulated from the lowest speed to the maximum for the tool. Thus a setting in register with the number 1 will be at the slowest speed, and the "+" will be at the maximum speed setting. The indicia 56 settings corresponding to the numbers 1 through 10 represent one of an infinite range of speed selectable for the potentiometer 44 with the one corresponding to the slowest speed and the ten corresponding to the fastest; all the speeds of which are below the maximum speed of the motor 20. However, if the maximum speed is desired, the operator merely has to turn the control knob 58 to place the window 78 over the "+" at which point the cam 94 will operatively engage the microswitch 46 to cause the motor to run at its maximum speed. Thus the operator need only manipulate a single control, namely said switching device 8, in order to either vary the motor speed below a maximum or to set the motor speed at a maximum.

In the event that the limits of arcuate travel are not to be determined by the arcuate travel of the potentiometer 44, then, suitable stops (not shown) could be fixed to the camming disc 88 so as to prevent continuous and uncontrolled turning of the control knob 58.

It will be understood that various changes in the details, materials, arrangements of parts and operating conditions which have been herein described and illustrated in order to explain the nature of the invention may be made by those skilled in the art within the principles and scope of the invention as expressed in the claims.

Having thus set forth the nature of this invention, what I claim herein is:

1. A switching device for controlling the speed of a portable power tool driven by an electric motor having a control circuit, the motor carried within a housing of the tool, said switching device comprising:
   (a) a circuit board to carry the control circuit mounted in the housing,
   (b) a potentiometer of the control circuit mounted upon the circuit board,
   (c) a microswitch, normally open, mounted upon the circuit board spaced from, but in the same plane as the potentiometer, and acting as a line current bypass of the control circuit,
   (d) an end cover connected to the housing in superposition to the circuit board,
   (e) an aperture formed in the end cover in axial alignment to the potentiometer,
   (f) a control knob journaled in the end cover aperture,
   (g) the control knob including a hub portion and a connecting bar,
   (h) the connecting bar extends along the axial line to mechanically engage the potentiometer,
   (i) a ca mdisc non-rotatively carried by and axially slideable upon the hub portion of the control knob,
   (j) a cam disc non-rotatively carried by and axially to the axial line of the potentiometer and in arcuate line with the microswitch, whereby rotation of the control knob will bring the cam into engagement with the microswitch to operate the same, and
   (k) an annular spring disposed on the hub portion to urge the cam disc into abutment with the potentiometer to place the cam in the same plane as the microswitch, whereby said switching device operates the potentiometer and the microswitch so that the plane in which the potentiometer and the microswitch lies is not critical to the proper operations thereof.

2. The combination claimed in claim 1 wherein:
(a) the control knob is turnable through an angle of less than 360°,
(b) the control knob is turnable clockwise to successively increase the motor speed, and
(c) the cam is located on the cam disc with respect to the control knob travel operatively to actuate the microswitch at the end of the clockwise turning movement of the control knob.

References Cited

UNITED STATES PATENTS

| | | | |
|---|---|---|---|
| 2,942,221 | 6/1960 | Di Girolamo | 338—200 |
| 3,085,169 | 4/1963 | Abel | 318—305 X |
| 3,161,847 | 12/1964 | Matsunaga | 200—155 X |
| 3,209,228 | 9/1965 | Gawron | 318—345 |

ORIS L. RADER, Primary Examiner

R. J. HICKEY, Assistant Examiner

PO-1050
(5/69)

UNITED STATES PATENT OFFICE
CERTIFICATE OF CORRECTION

Patent No. 3,543,212                    Dated November 24, 1970

Inventor(s) Don Lewis Harvell

It is certified that error appears in the above-identified patent and that said Letters Patent are hereby corrected as shown below:

Column 3, lines 33 and 34, "annulr" should be --annular--.

Column 4, line 66, "(i)" should be --(j)--,
          line 66, "a cam disc non-rotatively carried by and axially" should be --a cam formed on the cam disc in spaced relation-- .

Signed and sealed this 14th day of September 1971.

(SEAL)
Attest:

EDWARD M.FLETCHER,JR.            ROBERT GOTTSCHLAK
Attesting Officer                 Acting Commissioner of Patent